(12) United States Patent
Nel

(10) Patent No.: US 10,831,431 B2
(45) Date of Patent: Nov. 10, 2020

(54) SHELVING DISPLAY

(71) Applicant: Anthony, Inc., Sylmar, CA (US)

(72) Inventor: Garth Trevor Nel, Simi Valley, CA (US)

(73) Assignee: Anthony, Inc., Sylmar, CA (US)

( * ) Notice: Subject to any disclaimer, the term of this patent is extended or adjusted under 35 U.S.C. 154(b) by 49 days.

(21) Appl. No.: 15/956,263

(22) Filed: Apr. 18, 2018

(65) Prior Publication Data

US 2019/0339923 A1    Nov. 7, 2019

Related U.S. Application Data

(60) Provisional application No. 62/486,874, filed on Apr. 18, 2017.

(51) Int. Cl.
| | |
|---|---|
| *G06F 3/147* | (2006.01) |
| *G06F 3/14* | (2006.01) |
| *G06Q 10/08* | (2012.01) |
| *G09F 3/20* | (2006.01) |

(Continued)

(52) U.S. Cl.
CPC ............ *G06F 3/1446* (2013.01); *G06F 3/147* (2013.01); *G06Q 10/087* (2013.01); *G09F 3/208* (2013.01); *H04L 67/12* (2013.01); *G06Q 30/0607* (2013.01)

(58) Field of Classification Search
CPC ...... G06Q 30/02; G06Q 30/06; G06Q 10/087; G06Q 20/201; G06Q 30/0601; G06Q 20/203; G06Q 30/00; G06Q 30/0241; G06Q 20/20; G06Q 20/202; G06Q 20/204;

(Continued)

(56) References Cited

U.S. PATENT DOCUMENTS

| | | | |
|---|---|---|---|
| 6,749,116 B2 * | 6/2004 | Massaro | A47F 5/0068 235/383 |
| 6,844,821 B2 * | 1/2005 | Swartzel | G06Q 30/06 235/385 |

(Continued)

FOREIGN PATENT DOCUMENTS

KR    2012-0077595    7/2012

OTHER PUBLICATIONS

YouTube.com [online] "Panasonic Powershelf Solutions Demo—Personal Care (b-roll/no audio)," dated Jan. 11, 2015, [retrieved on Dec. 17, 2018], Retrieved from https://www.youtube.com/watch?v=snaCs9zUVH4&feature=youtu.be, 2 pages.

(Continued)

*Primary Examiner* — Nay Tun
(74) *Attorney, Agent, or Firm* — Fish & Richardson P.C.

(57) ABSTRACT

One broad aspect of the invention features a shelving facing display. The shelving facing display includes a housing, an electronic display, and multiple product sensors. The housing is mountable to a forward edge of a product shelf. The electronic display is mounted to the housing and arranged to be viewed from in front of the shelf. The electronic display is controllable to present desired images across at least a majority of a width of the shelf. The multiple product sensors are mounted to the housing. Each sensor is arranged to detect product on a respective width of the shelf. The display is configured to alter a displayed image in response to input from the product sensors.

20 Claims, 5 Drawing Sheets

(51) Int. Cl.
*H04L 29/08* (2006.01)
*G06Q 30/06* (2012.01)

(58) Field of Classification Search
CPC ............ G06Q 30/0212; G06Q 30/0607; G06F 3/1446; G06F 3/147; G09F 3/208; H04L 67/12
USPC ........................................................ 340/5.91
See application file for complete search history.

(56) References Cited

U.S. PATENT DOCUMENTS

| | | | |
|---|---|---|---|
| 7,233,241 B2* | 6/2007 | Overhultz | A47F 10/02 211/59.2 |
| 7,520,429 B2 | 4/2009 | Koster | |
| 7,792,711 B2* | 9/2010 | Swafford, Jr. | A47F 1/126 705/22 |
| 8,061,600 B2 | 11/2011 | Goel et al. | |
| 8,189,855 B2 | 5/2012 | Opalach et al. | |
| 8,800,869 B2 | 8/2014 | Waters | |
| 9,031,872 B1* | 5/2015 | Foster | G06F 3/147 340/5.91 |
| 9,576,417 B2* | 2/2017 | Christianson | G07F 11/38 |
| 10,002,307 B2* | 6/2018 | Zaremski | G06K 9/00771 |
| 10,210,603 B2* | 2/2019 | Venable | G01S 17/88 |
| 10,357,118 B2* | 7/2019 | Swafford | A47F 5/0068 |
| 10,387,897 B2* | 8/2019 | Sakata | G06K 9/00671 |
| 2002/0109593 A1* | 8/2002 | Swartzel | G06Q 10/087 340/540 |
| 2004/0225578 A1 | 11/2004 | Hager et al. | |
| 2005/0030158 A1* | 2/2005 | Schulmerich | G06F 3/1462 340/5.91 |
| 2007/0023511 A1* | 2/2007 | Smith | G06Q 10/087 235/385 |
| 2008/0077511 A1* | 3/2008 | Zimmerman | G06Q 10/00 705/28 |
| 2008/0189170 A1* | 8/2008 | Ramachandra | G06Q 30/02 705/7.29 |
| 2012/0166241 A1* | 6/2012 | Livingston | G06Q 10/0631 705/7.12 |
| 2014/0201042 A1 | 7/2014 | Meyer | |
| 2014/0366413 A1* | 12/2014 | Weidauer | B32B 3/266 40/638 |
| 2015/0146018 A1* | 5/2015 | Kayser | H04N 1/00204 348/207.1 |
| 2015/0317682 A1* | 11/2015 | Kayser | G01G 19/42 705/14.55 |
| 2016/0026032 A1* | 1/2016 | Moore | G06K 7/10316 382/103 |
| 2016/0035012 A1* | 2/2016 | Abell | G06Q 30/0641 705/27.1 |
| 2016/0048798 A1 | 2/2016 | Meyer et al. | |
| 2016/0055562 A1* | 2/2016 | Kim | G06Q 30/0623 705/26.61 |
| 2016/0132822 A1 | 5/2016 | Swafford | |
| 2016/0134930 A1* | 5/2016 | Swafford | A47F 5/0068 725/80 |
| 2016/0171707 A1* | 6/2016 | Schwartz | G06K 9/342 382/180 |
| 2017/0178060 A1* | 6/2017 | Schwartz | G06K 9/6267 |
| 2018/0068256 A1* | 3/2018 | Marder | G06Q 10/087 |
| 2018/0114257 A1* | 4/2018 | Conville | G06Q 30/0283 |
| 2018/0165711 A1* | 6/2018 | Montemayor | G06Q 30/0269 |
| 2018/0181906 A1* | 6/2018 | Baduge | H04W 4/35 |
| 2018/0189725 A1* | 7/2018 | Mattingly | G06F 3/1446 |
| 2018/0276596 A1* | 9/2018 | Murthy | G06K 9/00771 |
| 2018/0308041 A1* | 10/2018 | Sundholm | G06Q 10/087 |
| 2019/0050792 A1* | 2/2019 | Kobayashi | G06Q 10/087 |
| 2019/0272498 A1* | 9/2019 | Swafford | G06Q 10/087 |
| 2019/0282000 A1* | 9/2019 | Swafford | A47F 5/0068 |

OTHER PUBLICATIONS

YouTube.com [online] "GT Capstone Spring 2016—The Polar Bears," dated May 21, 2016, [retrieved on Dec. 17, 2018], Retrieved from https://www.youtube.com/watch?v=w49BdS8ogg , 2 pages.
Cohn et al, "Panasonic Introduces Intelligent Retail Shelving Solution at NRF 2015," BusinessWire, dated Jan. 11, 2015, 4 pages.
"Revolutionizing Retail Power at the Shelf," Powershelf, year 2018, 15 pages.
"Game Changing Digital Experiences," SoftVision, year 2018, 6 pages.
Coolidge, "Kroger tests 'Smart Shelf' Technology," Cincinnati. com: The Enquirer, dated Oct. 2, 2015.
"Panasonic Powershelf Solutions Demo—Personal Care (b-roll/no audio)," dated Jan. 11, 2015, Retrieved from https://www.youtube.com/watch?v=snaCs9zUVH4&feature=youtu.be. [Video Submission].
"GT Capstone Spring 2016—The Polar Bears," dated May 21, 2016, Retrieved from https://www.youtube.com/watch?v=w49BdS8og_g. [Video Submission].

* cited by examiner

SHELVING DISPLAY

CROSS-REFERENCE TO RELATED APPLICATION

This application claims the benefit of the filing date of U.S. Provisional Application No. 62/486,874, filed on Apr. 18, 2017. The contents of U.S. Application No. 62/486,874 are incorporated herein by reference in their entirety.

BACKGROUND

Stores often provide pricing and other product information on the shelves on which products are displayed. Sometimes stock is exhausted or must be rearranged, and pricing information needs to be occasionally updated. Sometimes additional signage is applied to shelf fronts to indicate a temporary sale. Some stores do not use shelving tags and instead use other signage or rely on the product itself as the signage. Refrigerated displays will typically have a glass door that must be opened to gain access to the product, arranged on shelving within the refrigerated space. Restocking such shelves is generally done from the rear of the shelf, by a stocking clerk. Improvements are sought in displaying and updating product information on shelves, and managing store inventories.

SUMMARY

One broad aspect of the invention features a shelving facing display. The shelving facing display includes a housing, an electronic display, and multiple product sensors. The housing is mountable to a forward edge of a product shelf. The electronic display is mounted to the housing and arranged to be viewed from in front of the shelf. The electronic display is controllable to present desired images across at least a majority of a width of the shelf. The multiple product sensors are mounted to the housing. Each sensor is arranged to detect product on a respective width of the shelf. The display is configured to alter a displayed image in response to input from the product sensors. This and other implementations can each optionally include one or more of the following features.

In some implementations, the product sensors are associated with respective pixel groups of the electronic display such that the display is configured to alter images displayed in each pixel group in response to input from an associated product sensor.

Some implementations include a controller coupled to the electronic display and to the product sensors, where the controller is configured to arrange images relevant to products in respective pixel groups of the electronic display.

In some implementations, the product sensors are associated with respective pixel groups of the electronic display.

In some implementations, the controller is configured to alter an image presented in a pixel group of the display in response to determining that input from a product sensor associated with the pixel group indicates that no product is located on the respective width of the shelf.

In some implementations, the controller is configured to alter an image presented in a pixel group of the display in response to determining that input from a product sensor associated with the pixel group indicates that a low stock for a product that is located on the respective width of the shelf.

In some implementations, the controller is configured to send an out of stock notification to a user computing device in response to determining that input form a product sensor associated with the pixel group indicates that no product is located on the respective width of the shelf.

In some implementations, the electronic display is a liquid crystal display (LCD), a light-emitting diode (LED) display, an organic light-emitting diode display (OLED), or an electroluminescent display (ELD).

In some implementations, the product sensors are proximity sensors.

In some implementations, the product sensors are imaging sensors.

Another aspect of the invention features a method of controlling a display. The method includes obtaining product image data for multiple different products. The method includes selecting, for each of the multiple different products, a location on an electronic display for displaying a product image associated with a respective product, where the electronic display is mounted to a shelf, and where each location on the electronic display is selected such that the product image is to be viewed in front of the respective product. The method includes controlling the electronic display to present the product images in the selected locations of the electronic display. The method includes altering one or more of the product images in response to receiving input from one or more product sensors from among multiple product sensors, where each product sensor is arranged to detect product on a respective width of the shelf. Other implementations of this aspect include corresponding systems, apparatus, and computer programs, configured to perform the actions of the methods, encoded on computer storage devices. These and other implementations can each optionally include one or more of the following features.

In some implementations, each location on the electronic display is a respective group of pixels of the electronic display.

In some implementations, controlling the electronic display to present the product images in the selected locations of the electronic display includes arranging the product images to be displayed in the respective pixel groups of the selected locations.

In some implementations, each product sensor is associated with a respective pixel group of the electronic display.

In some implementations, altering the one or more of the product images includes altering a particular product image in response to determining that input from a particular product sensor associated a respective pixel group in which the particular product image is displayed indicates that no product is located on a width of the shelf associated with the particular product sensor.

In some implementations, altering the one or more of the product images includes altering a particular product image in response to determining that input from a particular product sensor associated a respective pixel group in which the particular product image is displayed indicates that a low stock for a product that is located on a width of the shelf associated with the particular product sensor.

In some implementations, the method includes sending an out of stock notification to a user computing device in response to determining that input from a product sensor indicates that no product is located on the respective width of the shelf.

In some implementations, electronic display is a liquid crystal display (LCD), a light-emitting diode (LED) display, an organic light-emitting diode display (OLED), or an electroluminescent display (ELD).

In some implementations, the product sensors are proximity sensors.

In some implementations, the product sensors are imaging sensors.

In some implementations, the method includes obtaining product location data that indicates planned locations of the multiple different products along the shelf and the locations on the electronic display for displaying the product images associated with the respective products are selected based on the product location data.

In some implementations, the product location data includes a planogram that provides a mapping between locations of products and locations of product sensors.

The concepts described herein may provide several advantages. For example, implementations of the invention may provide a shelving display that automatically reconfigures displayed product information in response to changes in products placed on a shelf. Implementations provide real-time updates to product inventories.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1A:
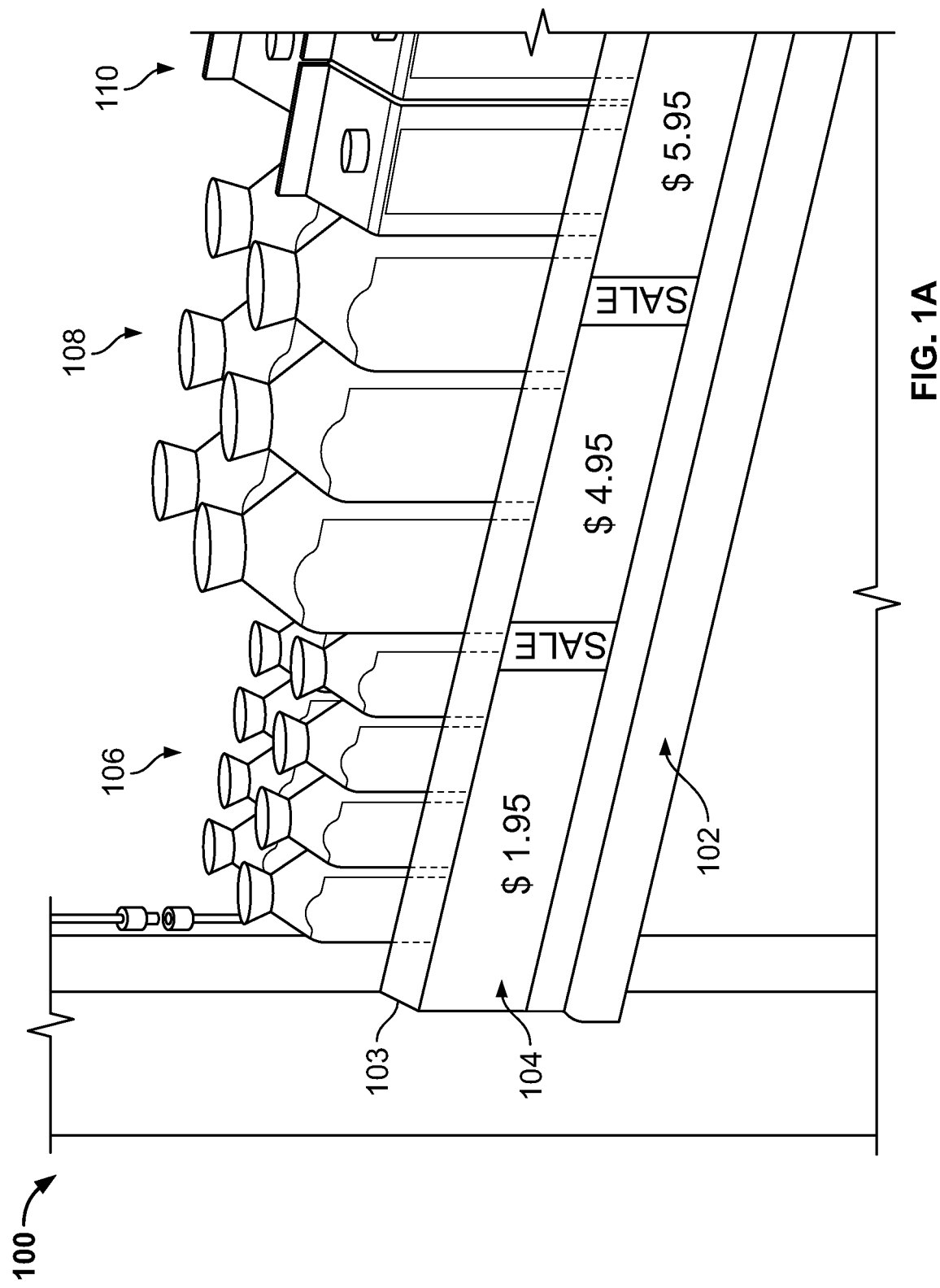
FIG. 1A is a front-perspective view of an exemplary shelving display.
Figure 1B:
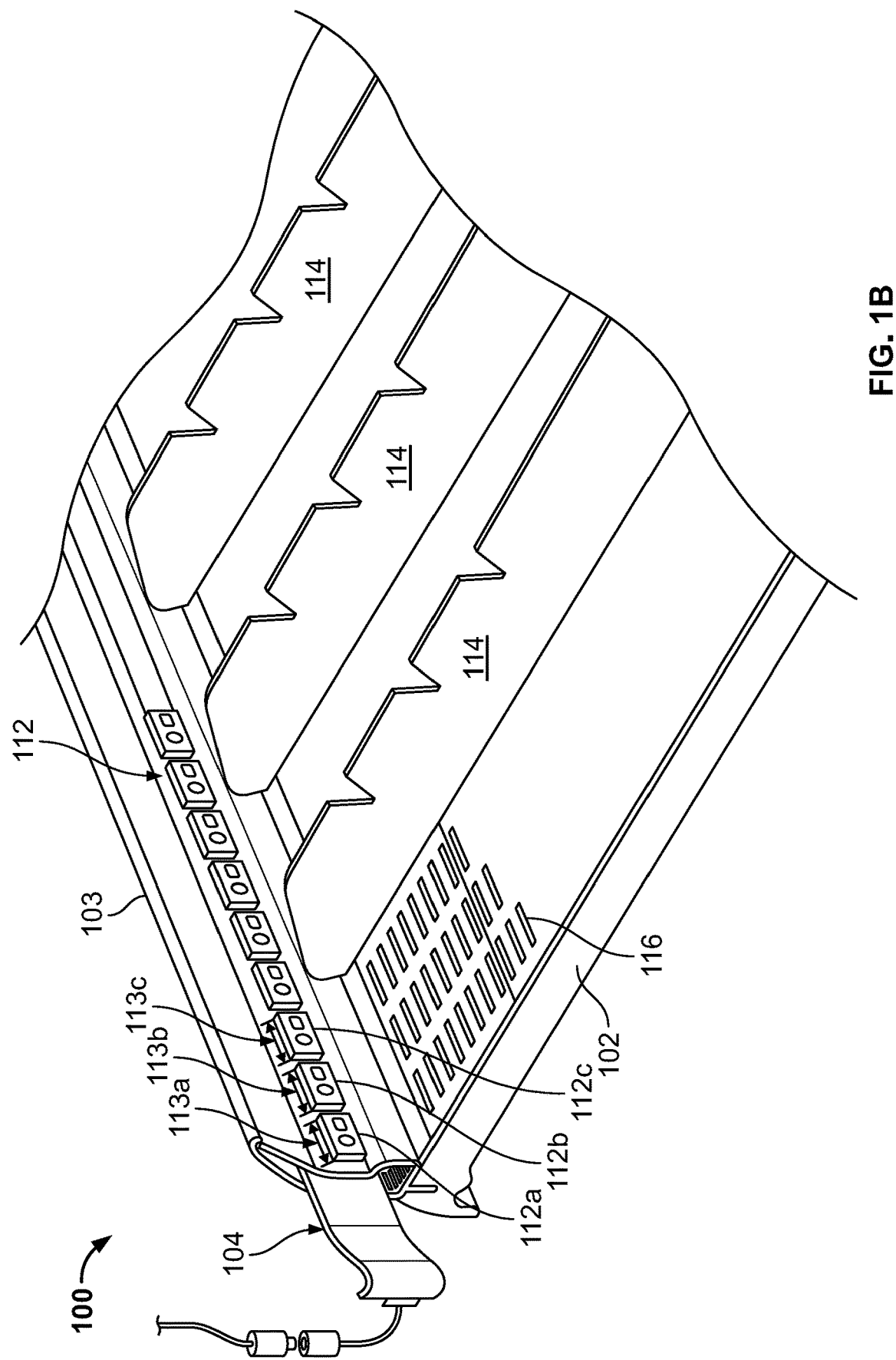
FIG. 1B is a rear-perspective view of the shelving display.
Figure 1C:
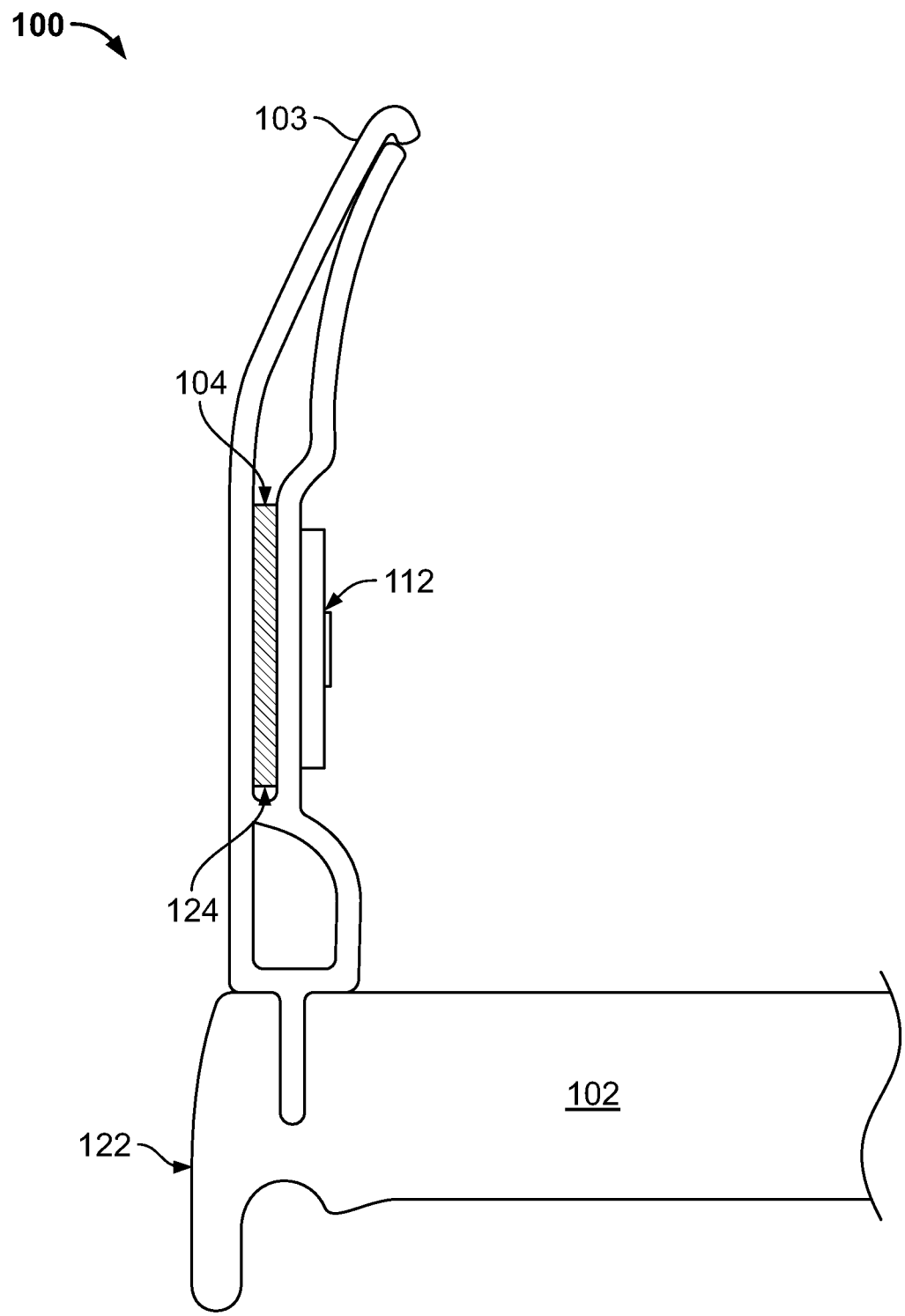
FIG. 1C is side cutaway view of the shelving display.

FIGS. 1A-1C illustrate an exemplary shelving display 100. Shelving display 100 includes a display housing 103 mounted at a forward end 122 of a product shelf 102. An electronic display 104 and product sensors 112 are mounted to display housing 103. Electronic display 104 is arranged to be viewed from in front of shelf 102. Electronic display 104 is controlled to present desired images along the width of shelf 102. The images can be related to products 106, 108, 110 placed behind housing 103, e.g., the images can include product pricing information and sale information. Furthermore, images displayed on electronic display 104 can be altered in response to output of the product sensors 112.

Shelving display 100 is controllable to present images that are relevant to products 106, 108, or 110 located behind various sections or widths of electronic display 104. For example, as shown in FIG. 1A, a first portion of electronic display 104 shows a price of $1.95 for product 106, a second portion of electronic display 104 shows an advertisement indicating a sale price of $4.95 for product 108, and a third portion of electronic display 104 shows an advertisement for a sale price of $5.95 for product 110. Furthermore, images presented on electronic display 104 can be altered in response to output of product sensors 112. For example, images presented on electronic display 104 can be adjusted in size to match a width of shelf 102 occupied by a product. Thus, if a product sensor output indicates that the left-most row of product 106 is empty, the size of the "$1.95" price image can be adjusted to match the width of shelf 102 occupied by the remaining three rows of product 106. For example, the size of the size of the "$1.95" price image can be automatically adjusted to match the width of shelf 102 occupied by the remaining three rows of product 106

Electronic display 104 can be a continuous display that extends along the width of shelf 102. In some implementations, electronic display 104 extends along a majority of the width of shelf 102. That is, electronic display 104 can continuously extend a distance along shelf 102 to cover a width that is sufficient to extend in front of products space for multiple different products 106,108, 110. In some implementations, electronic display 104 extends along the entire width of shelf 102.

Electronic display 104 can be a thin flexible display mounted to housing 103. As illustrated in FIG. 2C, electronic display 104 can be mounted to housing 103 by being inserted within a channel 124 of housing 103. Housing 103 can, thereby, serve as a protective covering for electronic display 104. Housing 103 can be constructed of a transparent or semi-transparent material. For example, housing 103 can be constructed of a plastic material, a polymer material, or glass. Housing 103 be configured to reduce glare on the front surface, through which electronic display 104 is viewed. For example, housing 103 can include an anti-reflective coating.

Electronic display 104 can be a digital display. For example, electronic display 104 can be a liquid crystal display (LCD), a light-emitting diode (LED) display, an organic light-emitting diode display (OLED), or an electroluminescent display (ELD). Electronic display 104 can be a static digital display, e.g., an electrophoretic display. In implementations in which shelving display 100 is installed inside a refrigerated cabinet, it may be preferable to use an electronic display that has a low thermal output (e.g., an OLED) to minimize the amount heat introduced into the refrigerated cabinet by display 104.

Products sensors 112 are arranged to detect product placed on a respective width of shelf 102. For example, referring to FIG. 1B, product sensors 112a, 112b, and 112c are arranged on a back-side of housing 103 to each detect product placed on respective widths 113a, 113b, 113c of shelf 102. In addition, as described in more detail below in reference to FIG. 3, each product sensor 112 can be associated with a respective width of electronic display 104. For example, output from each sensor can be used to control images displayed along a respective width of display 104. For example, as illustrated in FIGS. 1B and 1C products sensors 112 can be mounted in alignment with the respective width of display 104 which their output is used to control. As shown in FIGS. 1B and 1C, product sensors 112 are mounted directly behind a portion of display 104 for which the output of each respective sensor 112 is used to control.

Product sensors 112 can be proximity sensors or imaging sensors. For example, proximity sensors include sensors that are capable of detecting the presence of an object near the sensor with or without the object contacting the sensor. In addition, some proximity sensors can detect a distance to an object in proximity to the sensor (e.g., a ranging sensor). Proximity sensors can include ultrasound sensors, laser sensors, and optical sensors (e.g., IR sensors). Imaging sensors can obtain still or video images of an object near the sensor. Imaging sensors include low and high resolution optical or infra-red cameras.

In some implementations, product sensors 112 can be mounted at a rearward end of shelf 102. In such implementations, each product sensor 112 can still be arranged to detect product on the respective width of shelf 102. Each product sensor can be arranged to detect product on shelf 102 from a forward facing direction. That is, product sensors 112 can be directed towards a back portion of each respective row of products 106, 108, and 110 (e.g., the sensors 112 are facing the back of the last product in the row). In such implementation, product sensors 112 can be configured to detect distance. For example, a rearward mounted sensor 112 can be configured to provide an output signal that indicates a distance along the depth of shelf 102 between the location of the sensor and a respective product 106, 108, or 110 at the back of a row of products. A shelving display controller (discussed in more detail below) can use the distance measurement to detect whether the row of products is out of stock, low on stock, or both.

In some implementations, shelving display 100 can include pairs of product sensors 112 where each pair of sensors is configured to detect product placed on a respective width of shelf 102. For example, a given pair of product sensors 112 can include one sensor mounted near the forward end 122 of shelf 102, e.g., on housing 103 as shown, and a second sensor mounted near the rearward end of shelf 102, as described above.

Referring again to FIGS. 1A-1C, shelf 102 can be a flat shelf or a gravity feed shelf. For example, a flat shelf is one in which products 106, 108, 110 from the back of a row of products do not automatically move towards the front of the shelf when a product is removed from the front of a row. A gravity feed shelf allows products 106, 108, 110 to feed forward (towards the front of a shelf) when a product is removed from the front of a row. Shelf 102 can include spacers 114, e.g., to separate different products. Shelf 102 can include rollers 116, e.g., to facilitate gravity feeding of products.

Figure 2:
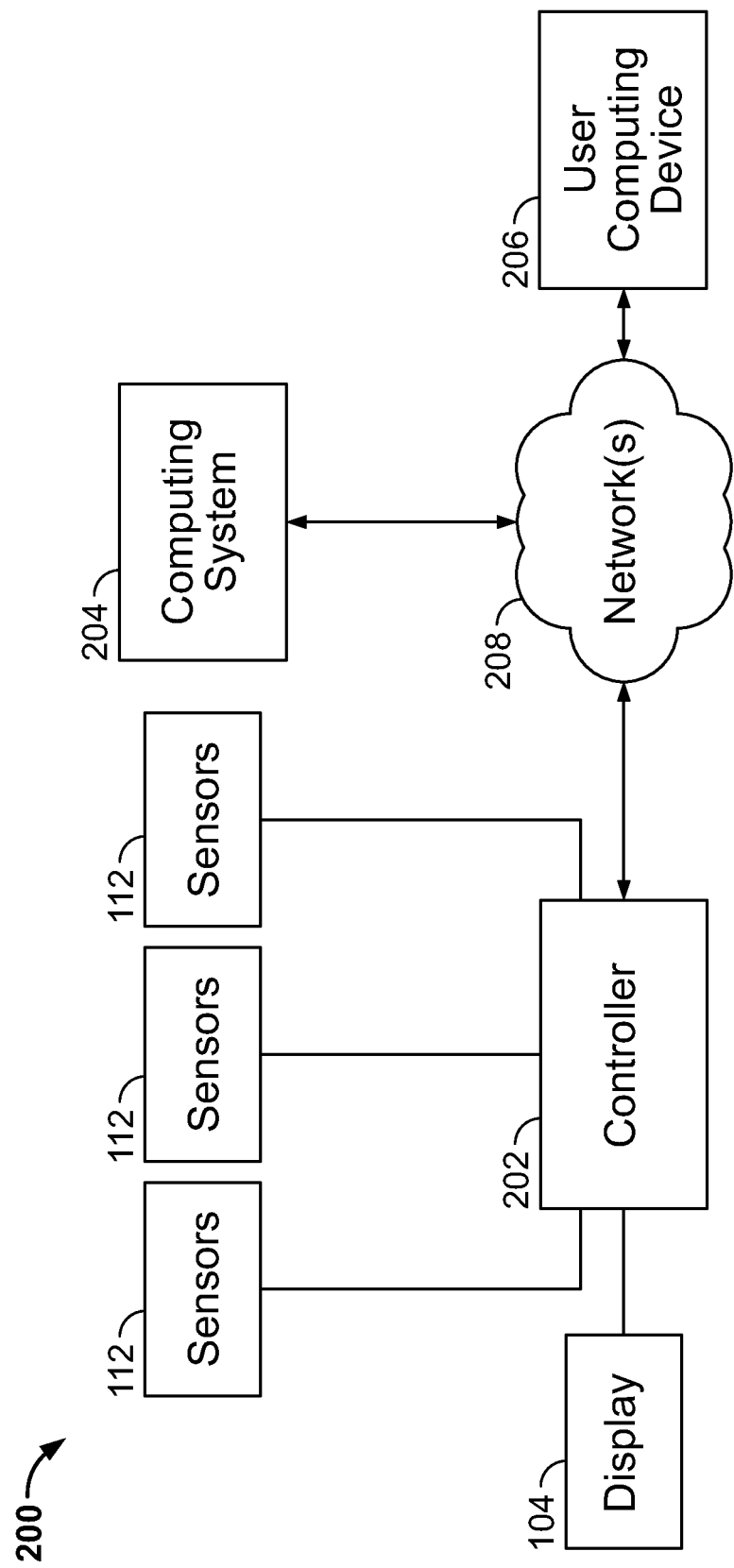
FIG. 2 is a block diagram of an exemplary control system for the shelving display.

FIG. 2 is a block diagram of an exemplary control system 200 for shelving display 100. Control system 200 includes a controller 202 coupled to display 104 and product sensors 112. Controller 202 controls the operations of electronic display 104 in accordance with input received from product sensors 112.

Controller 202 includes a communication interface to communicate with other computing systems over network 208. Controller 202 can communicate with computing system 204 and user computing device 206 over network 208. Computing system 204 can be, for example, a server system that stores information related to products displayed on retail shelfs in a store. User computing device 206 can be a computing device used by store personnel. For example, user computing device 206 can be, but is not limited to, a point of sale (POS) system, a desktop computer, a laptop computer, a tablet computer, a wearable computer, a handheld computer, or a smart phone.

Controller 202 can obtain product location data. Product location data can include data that indicates the planned locations of products along the width of shelf 102. That is, product location data indicates which products (e.g., by type, brand, name, sku number, etc.) are placed in in which location along the width of shelf 102. Product location data can be represented as, for example, a planogram that indicates the desired location of different products along width of shelf 102. Controller 202 can use the product location data to identify which products (e.g., by type, brand, name, SKU number, etc.) each product sensor 112 will be used to monitor. For example, controller 202 can use the product location data to correlate the positions of products along the width of shelf 102 with the respective portion of the width of shelf 102 that each sensor 112 is arranged to monitor. Controller 202 can, thereby, associate each sensor 112 with a particular product. In some implementations, the product data (e.g., a planogram) can provide a mapping between products and sensors 112. For example, a planogram can associate each sensor (e.g., by a sensor ID number) with a particular product.

Controller 202 can communicate with computing system 204 to obtain information associated with products displayed on shelf 102. Controller 202 can obtain product image data. Product image data can include data that represents product images to be presented on a portion of electronic display 104 that is positioned near a respective product. Product images can include, but are not limited to, product pricing, sales information, advertisements, product logos, coupons for products, video demonstrations of a product, suggested uses for a product (e.g., as an ingredient in a recipe), or any combination thereof.

Controller 202 receives sensor data from product sensors 112. For example, controller 202 can occasionally poll each of the product sensors 112. In response to begin polled, each sensor 112 transmits sensor data to controller 202. The sensor data can be binary data, for example, indicating whether or not product is detected within the respective portion (e.g., the respective width) of shelf 102 that is monitored by the polled sensor. The sensor data can include a distance measurement, for example, indicating a distance along the depth of shelf 102 between the polled sensor 112 and product located within the respective portion (e.g., the respective width) of shelf 102 that is monitored by the polled sensor. The sensor data can include an image of product located within the respective portion (e.g., the respective width) of shelf 102 that is monitored by the polled sensor.

Controller 202 determines whether the sensor data indicates that product is present within the portion of shelf 102 that is monitored by each sensor 112, and, in some implementations, how much product is present. For example, if the sensor data is binary sensor data, controller 202 determines whether or not the value of the sensor data indicates that product is present within the portion of shelf 102 that is monitored by the respective sensor 112. If the sensor data includes a distance measurement, controller 202 can determine how much product is present within the portion of shelf 102 that is monitored by the respective sensor 112. For example, controller 202 can use a threshold distance measurement as an indication that the stock of a given product on the shelf is low. For instance, a distance measurement that is greater than (or less than—depending on the arrangement of the sensor on shelf 102) the threshold distance can indicate a low stock condition. A different threshold distance (e.g., a distance comparable to the depth of an empty shelf) can indicate an out of stock condition.

Figure 3:
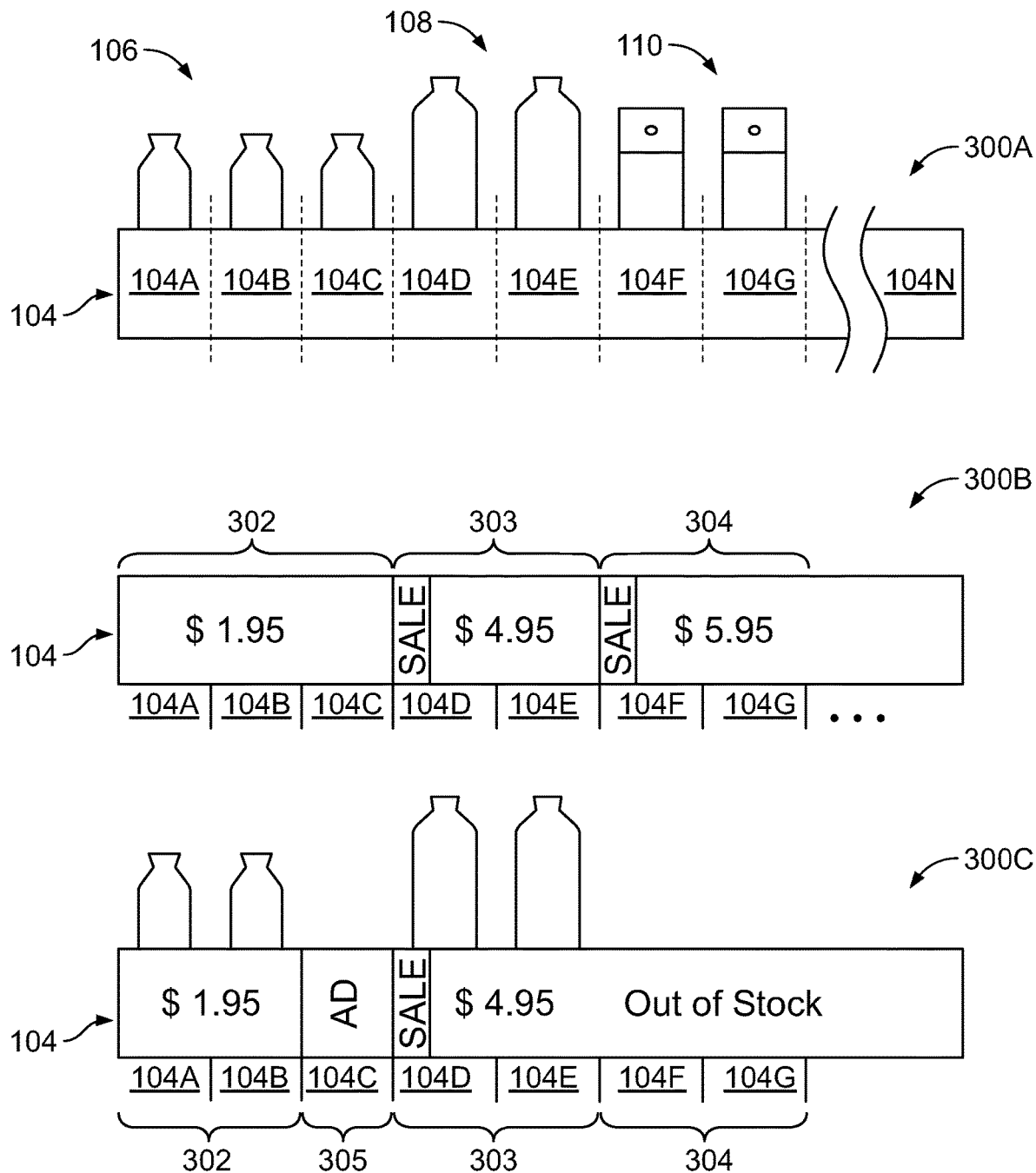
FIG. 3 depicts several diagrams that illustrate operations of the shelving display.

Controller 202 can control electronic display 104 to present different images in a portion of the display that is associated with each sensor 112 based on whether or not product is detected within the portion of shelf 102 that is monitored by each sensor 112. FIG. 3 shows a series of diagrams 300A-300C illustrating control of electronic display 104. As shown in diagram 300A, controller 202 can the images presented along electronic display 104 according to virtual partitions along the width of the display. The partitions can be represented by pixel groups 104A-104N of the electronic display 104. Each pixel group 104A-104N encompasses a respective width of the electronic display. Controller 202 can associate each pixel group 104A-104N with a respective product sensor 112 or a respective group of product sensors 112. For example, as shown in diagram 300A, the width of each pixel group 104A-104N can be comparable to the respective width of shelf 102 that is monitored by each sensor 112.

Controller 202 can arrange product image data for each respective product 106, 108, and 110 to be presented in appropriate locations of electronic display 104. For example, controller 202 can identify appropriate locations along electronic display 104 based on associations between the pixel groups 104A-104N and respective product sensors 112. Controller 202 can arrange and scale product image data associated with each product 106, 108, and 110 to be presented in the appropriate pixel groups pixel groups of electronic display 104. For example, as illustrated in diagrams 300A and 300B, a product image 302 that is associated with product 106 is displayed within pixel groups 104A-104C. Furthermore, each pixel group 104A-104C can be associate with product sensors 112a-112c of FIG. 1B, respectively, which controller 202 can use to display product images 302 in an appropriate location along the display. Diagrams 300A and 300B also illustrate product images 303 and 304, which are associated with products 108 and 110, displayed in pixel groups 104D-104E and 104F-104G.

Controller 202 can alter the images displayed in each pixel group 104A-104N of electronic display 104 based on input received from an associated product sensor 112. For example, diagram 300C illustrates that product 110 is out of stock. In response, controller 202 can detect the out of stock condition based on data received from respective product sensors 112, and alter image 304 that is displayed in pixel groups 104F-104G accordingly. As another example, diagram 300C illustrates that one row of product 106 is out of stock. In response, controller 202 rescales product images 302 (e.g., the price of $1.95) to fit within only pixel groups 104A-104B and obtains a different image 305 to present in pixel group 104C. For instance, when controller 202 detects that product 106 located in a portion of shelf 102 that is monitored by sensor 112c is out of stock, controller 202 can alter the images displayed in the respective pixel group of electronic display 104. More specifically, controller 202 can determine that product 106 is not completely out of stock, because other product sensors 112 that monitor portions of shelf 102 used to stock the same product 106 do not indicate an out of stock condition. Therefore, controller 202 can repurpose the portion of electronic display 104 that is in front of an empty row of product for another use such as an advertisement.

In some implementation, controller 202 can send notifications to store personnel to inform them when a product is out of stock on shelf 102 or low on stock. For example, upon detecting and out of stock condition or a low stock condition, controller 202 can send an appropriate notification to user computing device 206. The notification can be sent in a proprietary format or a general format. A proprietary format notification can include a notification that is sent only to particular user computing devices 206 associated with the store (e.g., POS devices) or to computing accounts associated with a store manager or store owner). A general format notification can include a notification sent in a general format including, but not limited to, an SMS message or an e-mail message.

In some implementations, controller 202 can control electronic display 104 to present different images in a portion of the display that is associated with each sensor 112 based on whether or not a low stock condition is detected within the portion of shelf 102 that is monitored by each sensor 112.

In some implementations, controller 202 can control the operation of multiple shelving displays 100. For example, one controller 202 can be used to control the operation of a shelving displays 100 multiple shelves of a shelving display unit.

Implementations of the subject matter and the operations described in this specification can be realized in analog or digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A shelving facing display, comprising
    a housing mountable to a forward edge of a shelf;
    an electronic display mounted on the housing and arranged to be viewed from in front of the shelf, the electronic display controllable to present desired images across at least a majority of a width of the shelf;
    multiple product sensors mounted to the housing, each sensor arranged to detect product on a respective width of the shelf; and
    a controller in electronic communication with the electronic display and the product sensors, the controller configured to perform operations comprising:
        obtaining product image data for multiple different products;
        obtaining product location data that indicates planned locations of the multiple different products along the shelf, the product location data comprising a planogram that associates identification data of individual product sensors with products listed in the planogram, wherein the planogram indicates a fully stocked shelf with expected product placements on the fully stocked shelf;
        selecting, for each of the multiple different products and based on the sensor identification data, a location on an electronic display for displaying a product image associated with a respective product, wherein the electronic display is mounted to a shelf, and wherein each location on the electronic display comprises a group of display pixels associated with a particular product sensor or group of product sensors, the location selected such that the product image is to be viewed in front of the respective product;
        controlling the electronic display to present the product images in the selected locations of the electronic display; and
        altering one or more of the product images in response to receiving input from one or more product sensors from among multiple product sensors.

2. The display of claim 1, wherein the controller is configured to alter an image presented in a pixel group of the display in response to determining that input from a product sensor associated with the pixel group indicates that no product is located on the respective width of the shelf.

3. The display of claim 1, wherein the controller is configured to alter an image presented in a pixel group of the display in response to determining that input from a product sensor associated with the pixel group indicates that a low stock for a product that is located on the respective width of the shelf.

4. The display of claim 1, wherein the controller is configured to send an out of stock notification to a user computing device in response to determining that input form a product sensor associated with the pixel group indicates that no product is located on the respective width of the shelf.

5. The display of claim 1, wherein the electronic display is selected from the group consisting of a liquid crystal display (LCD), a light-emitting diode (LED) display, an organic light-emitting diode display (OLED), and an electroluminescent display (ELD).

6. The display of claim 1, wherein the product sensors comprise one or more of ultra sound sensors, laser sensors, or infrared sensors.

7. The display of claim 1, wherein the product sensors further comprise imaging sensors.

8. A computer implemented method of controlling electronic shelving displays, the method executed by one or more processors and comprising:
    obtaining product image data for multiple different products;
    obtaining product location data that indicates planned locations of the multiple different products along a shelf, the product location data comprising a planogram that associates identification data of individual product sensors mounted to the shelf with products listed in the planogram, wherein the planogram indicates a fully stocked shelf with expected product placements on the fully stocked shelf;
    selecting, for each of the multiple different products and based on the sensor identification data, a location on an electronic display for displaying a product image associated with a respective product, wherein the electronic display is mounted to a shelf, and wherein each location on the electronic display comprises a group of display pixels associated with a particular product sensor or group of product sensors, the location selected such that the product image is to be viewed in front of the respective product;
    controlling the electronic display to present the product images in the selected locations of the electronic display; and
    altering one or more of the product images in response to receiving input from one or more of the product sensors from among multiple product sensors, wherein each product sensor is arranged to detect product on a respective width of the shelf.

9. The method of claim 8, wherein controlling the electronic display to present the product images in the selected locations of the electronic display comprises arranging the product images to be displayed in the respective pixel groups of the selected locations.

10. The method of claim 8, wherein altering the one or more of the product images comprises altering a particular product image in response to determining that input from a particular product sensor associated a respective pixel group in which the particular product image is displayed indicates that no product is located on a width of the shelf associated with the particular product sensor.

11. The method of claim 10, altering the one or more of the product images comprises altering a particular product image in response to determining that input from a particular product sensor associated a respective pixel group in which the particular product image is displayed indicates that a low stock for a product that is located on a width of the shelf associated with the particular product sensor.

12. The method of claim 8, further comprising sending an out of stock notification to a user computing device in response to determining that input from a product sensor indicates that no product is located on the respective width of the shelf.

13. The method of claim 8, wherein the electronic display is selected from the group consisting of a liquid crystal display (LCD), a light-emitting diode (LED) display, an organic light-emitting diode display (OLED), and an electroluminescent display (ELD).

14. The method of claim 8, wherein the product sensors are proximity sensors or imaging sensors.

15. The display of claim 1, wherein the product sensors are mounted at a rearward end of the shelf and each product sensors is arranged to measure a distance from the sensor to a product on the shelf.

16. The display of claim 15, wherein the operations comprise:

receiving a distance measurement from a first product sensor; and determining, based on the distance measurement, how much of a product that is associated with the sensor remains on the shelf.

17. The display of claim 16, wherein determining how much of the product that is associated with the first product sensor remains on the shelf comprises comparing the distance measurement with a threshold distance measurement.

18. The method of claim 8, wherein the product sensors are mounted at a rearward end of the shelf and each product sensors is arranged to measure a distance from the sensor to a product on the shelf.

19. The method of claim 18, further comprising:

receiving a distance measurement from a first product sensor; and determining, based on the distance measurement, how much of a product that is associated with the sensor remains on the shelf.

20. The method of claim 19, wherein determining how much of the product that is associated with the first product sensor remains on the shelf comprises comparing the distance measurement with a threshold distance measurement.

* * * * *

UNITED STATES PATENT AND TRADEMARK OFFICE
CERTIFICATE OF CORRECTION

PATENT NO. : 10,831,431 B2
APPLICATION NO. : 15/956263
DATED : November 10, 2020
INVENTOR(S) : Garth Trevor Nel Page 1 of 1

It is certified that error appears in the above-identified patent and that said Letters Patent is hereby corrected as shown below:

On the Title Page

Column 2, item [56], Other Publications, Line 4, delete "feature=youtu.be," and insert
-- feature=youtube, --, therefor.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*